(12) United States Patent
Zou

(10) Patent No.: US 11,435,096 B2
(45) Date of Patent: Sep. 6, 2022

(54) EVAPORATIVE AIR COOLER

(71) Applicant: Weiquan Zou, Xinhua (CN)

(72) Inventor: Weiquan Zou, Xinhua (CN)

( * ) Notice: Subject to any disclaimer, the term of this patent is extended or adjusted under 35 U.S.C. 154(b) by 0 days.

(21) Appl. No.: 17/546,051

(22) Filed: Dec. 9, 2021

(65) Prior Publication Data
US 2022/0099316 A1    Mar. 31, 2022

(51) Int. Cl.
*F24F 6/14*      (2006.01)
*F24F 13/22*     (2006.01)
*F24F 6/00*      (2006.01)

(52) U.S. Cl.
CPC .............. *F24F 6/14* (2013.01); *F24F 13/222* (2013.01); *F24F 2006/008* (2013.01)

(58) Field of Classification Search
CPC ...... F24F 6/14; F24F 13/222; F24F 2006/008; F24F 5/0035
See application file for complete search history.

(56) References Cited

U.S. PATENT DOCUMENTS

| | | |
|---|---|---|
| 2002/0195729 A1 | 12/2002 | Merrill et al. |
| 2009/0211290 A1* | 8/2009 | Gildersleeve ............. F28D 5/00 62/304 |
| 2013/0081414 A1 | 4/2013 | Penton |
| 2015/0308732 A1* | 10/2015 | Lee ........................... F24F 3/14 62/291 |
| 2017/0138650 A1* | 5/2017 | Eiserer ....................... F24F 6/04 |
| 2019/0277519 A1* | 9/2019 | Petersen ............... B01F 23/215 |

OTHER PUBLICATIONS

Nanosponge filters out herbicide poisons (Jan. 21, 2013) retrieved Mar. 9, 2022 from https://phys.org/news/2013-01-nanosponge-filters-herbicide-poisons.html (Year: 2013).*

* cited by examiner

*Primary Examiner* — Schyler S Sanks
(74) *Attorney, Agent, or Firm* — Zhihua Han; Wen IP LLC

(57) ABSTRACT

The present disclosure discloses an evaporative air cooler including a housing, an atomization part, and a cooling part. An accommodating cavity is arranged in the housing; a water storage tank is arranged at a bottom of the housing; the accommodating cavity is provided with an air inlet and an air outlet; the accommodating cavity communicating with the water storage tank; the atomization part includes an atomizer, and a water tank fixed to the housing; a first water storage cavity is arranged in the water tank; the atomizer is fixed to the water tank and placed in the accommodating cavity; the cooling part includes a wet curtain filter net and a fan which are fixed to the housing; the fan is arranged between the air inlet and the air outlet; and the wet curtain filter net being accommodated in the accommodating cavity and the water storage tank.

9 Claims, 3 Drawing Sheets

EVAPORATIVE AIR COOLER

TECHNICAL FIELD

The present disclosure relates to the field of household appliances, in particular to an evaporative air cooler.

BACKGROUND ART

An evaporative air cooler is essentially an electric fan equipped with a water evaporation component. The hot air entering the evaporative air cooler is cooled and then discharged according to the principle that water absorbs heat during evaporation, so as to achieve a cooling effect.

In the related art, air mixed with water vapor produces a large amount of condensed water at the bottom of the evaporative air cooler, and the condensed water will often flow out of evaporative air cooler and cannot be reused, resulting in waste.

SUMMARY

The present disclosure aims to at least solve one of the technical problems in the existing art. To this end, the present disclosure provides an evaporative air cooler which can effectively use condensed water.

Some embodiments of the present disclosure provide an evaporative air cooler, including:

a housing, an accommodating cavity being arranged in the housing, a water storage tank being arranged at a bottom of the housing, the accommodating cavity being provided with an air inlet and an air outlet, and the accommodating cavity communicating with the water storage tank;

an atomization part including an atomizer and a water tank, the water tank being fixed to the housing, a first water storage cavity being arranged in the water tank, the atomizer being fixed to the water tank and placed in the accommodating cavity, and the atomizer being used to atomize, in the accommodating cavity, water in the first water storage cavity into water vapor; and a cooling part including a wet curtain filter net and a fan, the wet curtain filter net and the fan being fixed to the housing, the fan being arranged between the air inlet and the air outlet, the wet curtain filter net being accommodated in the accommodating cavity and the water storage tank, the fan being used to blow the water vapor from the air outlet out of the accommodating cavity, and the wet curtain filter net being used to allow the water vapor to pass and absorb the condensed water in the water storage tank.

The evaporative air cooler according to the embodiments of the present disclosure at least has the following technical effects:

The condensed water in the accommodating cavity will be converged in the water storage tank, and the wet curtain filter net accommodated in the accommodating cavity and the water storage tank can fully absorb the condensed water in the water storage tank while the fan works, so that the condensed water absorbed by the wet curtain filter net can be re-evaporated for use under the action of the fan, which effectively reduces the waste of the condensed water.

In the evaporative air cooler according to some embodiments of the present disclosure, the evaporative air cooler further includes a water storage part; the water storage part is fixed below the housing; a second water storage cavity is arranged in the water storage part; a bottom of the water storage tank is provided with a communicating hole which is used to communicate the second water storage cavity with the water storage tank; and the wet curtain filter net passes through the communicating hole and is accommodated in the accommodating cavity, the water storage tank, and the second water storage cavity.

In the evaporative air cooler according to some embodiments of the present disclosure, the second water storage cavity is provided with a water outlet which is used to discharge the condensed water in the second water storage cavity.

In the evaporative air cooler according to some embodiments of the present disclosure, a nano sponge is paved in the water storage tank.

In the evaporative air cooler according to some embodiments of the present disclosure, the wet curtain filter net is arranged on a side of the atomizer facing the air outlet.

In the evaporative air cooler according to some embodiments of the present disclosure, a material of the wet curtain filter net is cotton cloth or non-woven cloth or wood pulp paper or polypropylene.

In the evaporative air cooler according to some embodiments of the present disclosure, the evaporative air cooler further includes a control part; and the control part is mounted to the housing and is used to switch working modes of the evaporative air cooler.

In the evaporative air cooler according to some embodiments of the present disclosure, the evaporative air cooler further includes an air guide member; the air guide member is fixed to the housing and is arranged at the air outlet; and the air guide member is used to guide a direction where the water vapor is blown out from the air outlet.

In the evaporative air cooler according to some embodiments of the present disclosure, the evaporative air cooler further includes a water level window; a water level hole is formed in the housing and communicates with the first water storage cavity; and the water level window is embedded into the water level hole and is used to observe a water level in the first water storage cavity from the outside.

In the evaporative air cooler according to some embodiments of the present disclosure, the evaporative air cooler further includes a handle; and two ends of the handle are respectively connected to the housing.

Additional aspects and advantages of the present disclosure will be provided in the following descriptions, and will become apparent from the following descriptions or be learned through the practice of the present disclosure.

BRIEF DESCRIPTION OF THE DRAWINGS

The above and/or additional aspects and advantages of the present disclosure will become apparent and easily understandable from the following descriptions of the embodiments with reference to the accompanying drawings.

Figure 1:
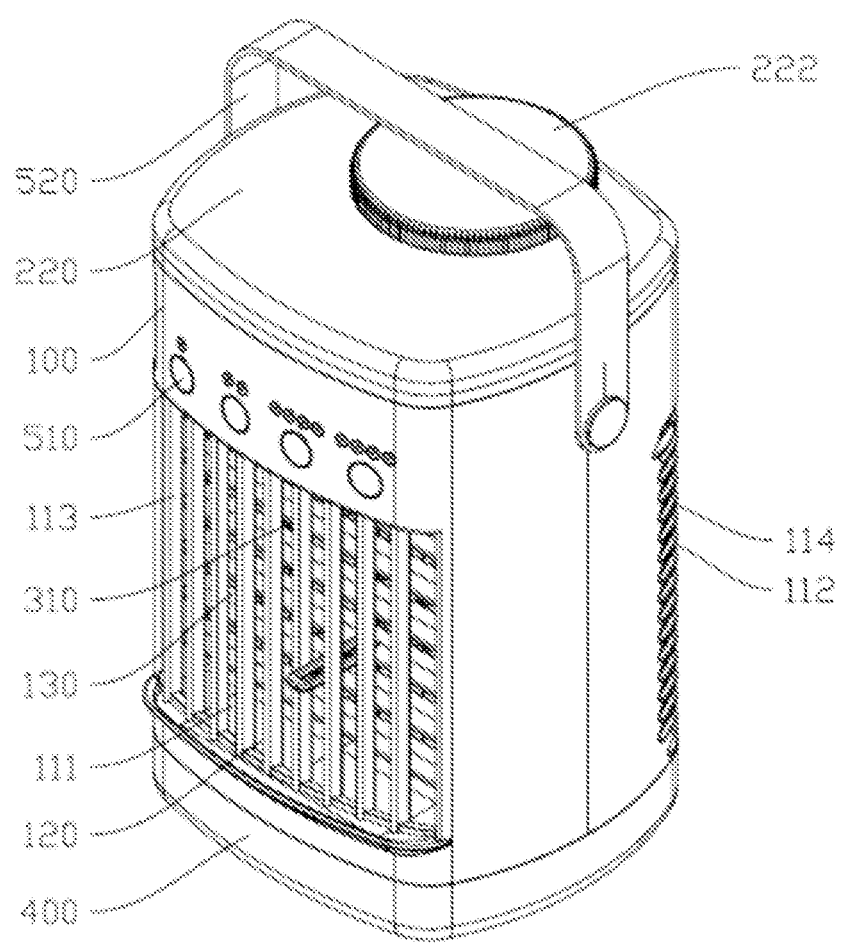
FIG. 1 is a schematic three-dimensional diagram of an evaporative air cooler in the embodiments of the present disclosure.

Reference signs in the drawings: 100: housing; 110: accommodating cavity; 111: air outlet; 112: air inlet; 113: fence; 114: grid plate; 120: water storage tank; 130: air guide member; 140: water level window; 200: atomization part; 210: atomizer; 220: water tank; 221: first water storage cavity; 222: water feed cover; 300: cooling part; 310: wet curtain filter net; 320: fan; 400: water storage part; 410: second water storage cavity; 411: water outlet; 510: control button; and 520: handle.

DETAILED DESCRIPTION OF THE EMBODIMENTS

The embodiments of the present disclosure are described in detail below. Examples of the embodiments are shown in the accompanying drawings. The same or similar reference signs represent the same or similar elements or elements having the same or similar functions throughout. The embodiments described below with reference to the drawings are exemplary, and are only used to explain the present disclosure, and should not be construed as limiting the present disclosure.

In the description of the present disclosure, it should be understood that orientations or positional relationships indicated by the terms "upper", "lower", "front", "rear", "left", "right", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure.

In the description of the present disclosure, "several" means one or more; "multiple" means two or more; "greater than", "less than", "exceeding", and the like mean not including this number; and "above", "below", and "within" are understood as including this number. If it is described that first and second are only for the purpose of distinguishing the technical features, and cannot be understood as indicating or implying the relative importance or implicitly specifying the number of the indicated technical features or implicitly specifying the order of the indicated technical features.

Figure 2:
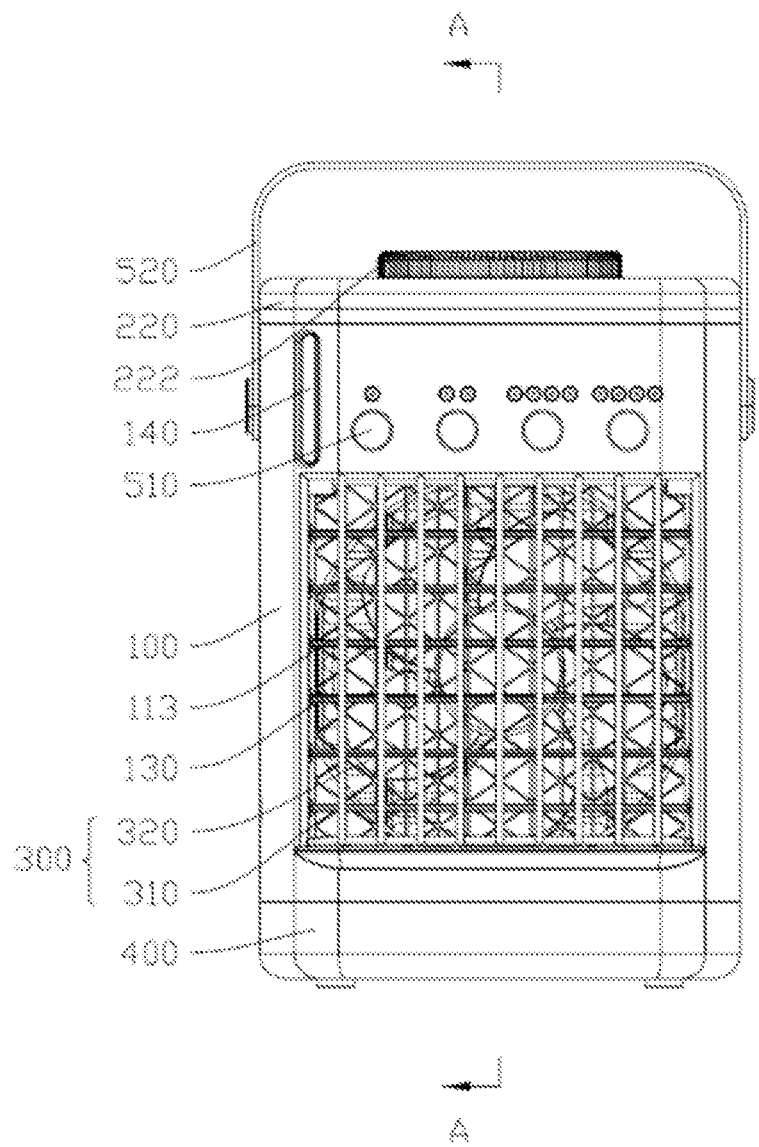
FIG. 2 is a front view of an evaporative air cooler in the embodiments of the present disclosure.
Figure 3:
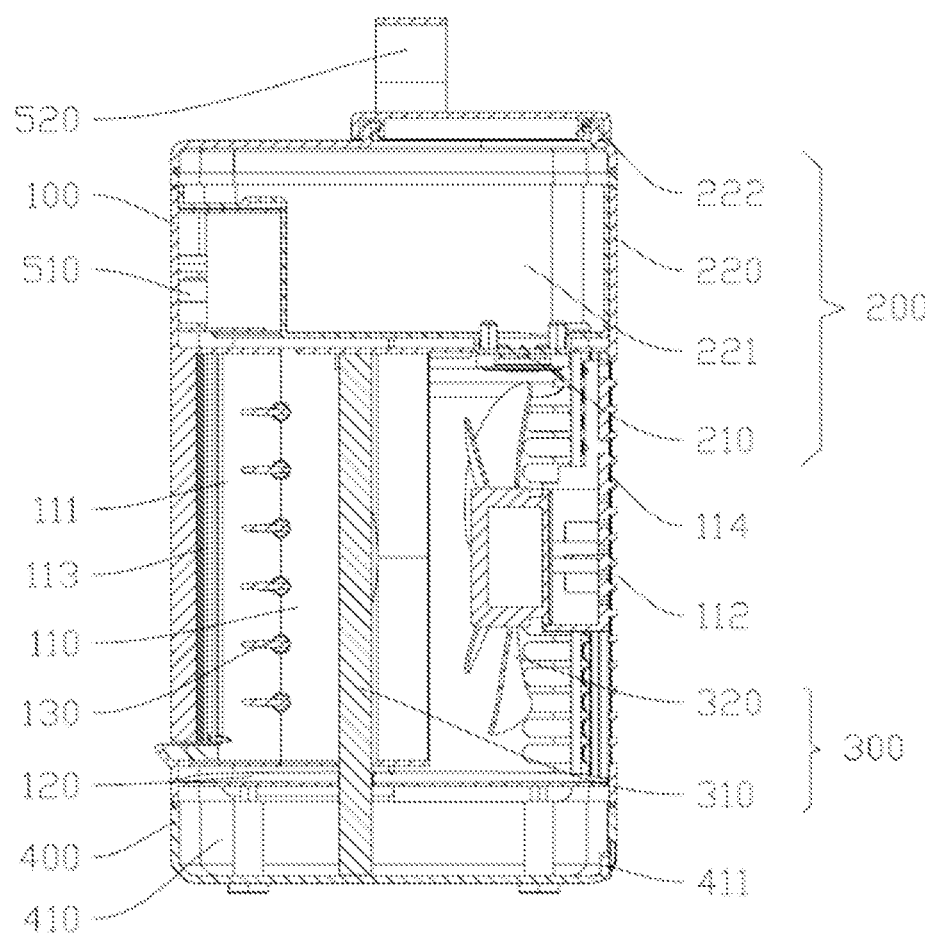
FIG. 3 is a cutaway view of the evaporative air cooler in FIG. 2 along the A-A direction.

An evaporative air cooler according to the embodiments of the present disclosure is described below with reference to FIG. 1 to FIG. 3.

The evaporative air cooler according to the embodiments of the present disclosure includes a housing 100, an atomization part 200, and a cooling part 300.

An accommodating cavity 110 is arranged in the housing 100; a water storage tank 120 is arranged at a bottom of the housing 100; the accommodating cavity 110 is provided with an air inlet 112 and an air outlet 111; and the accommodating cavity 110 communicates with the water storage tank 120. The atomization part 200 includes an atomizer 210 and a water tank 220; the water tank 220 is fixed to the housing 100; a first water storage cavity 221 is arranged in the water tank 220; the atomizer 210 is fixed to the water tank 220 and is placed in the accommodating cavity 110; and the atomizer 210 used to atomize, in the accommodating cavity 110, water in the first water storage cavity 221 into water vapor. The cooling part 300 includes a wet curtain filter net 310 and a fan 320; the wet curtain filter net 310 and the fan 320 are both fixed to the housing 100; the fan 320 is arranged between the air inlet 112 and the air outlet 111; the wet curtain filter net 310 is accommodated in the accommodating cavity 110 and the water storage tank 120; the fan 320 is used to blow the water vapor from the air outlet 111 of the accommodating cavity 110; and the wet curtain filter net 310 is used to allow the water vapor to pass and absorb the condensed water in the water storage tank 120.

Specifically, the function of the housing 100 is to support all components in the evaporative air cooler, and the shape of the housing can be adjusted according to an actual need. According to a positional relationship of the evaporative air cooler on a flat plane, the accommodating cavity 110 and the water storage tank 120 are respectively arranged in the housing 100 from top to bottom; the accommodating cavity 110 and the water storage tank 120 communicate with each other; openings communicating to the outside are formed in two sides of the accommodating cavity 110 and are respectively the air inlet 112 and the air outlet 111. The air outlet 111 and the air inlet 112 may be usually provided with latticed grid plates 114 or paliform fences 113 to prevent a user from mis-touching elements in the accommodating cavity 110.

The atomization part 200 includes the atomizer 210 and the water tank 220. The atomizer 210 usually adopts an ultrasonic atomizer 210, or may be an air compression type atomizer 210. The water tank 220 is used to store water, in which the first water storage cavity 221 is arranged. A through hole is farmed in an inner wall of the first water storage cavity 221, so that the user can feed water into the first water storage cavity 221 from the through hole. A water feed cover 222 is arranged at the through hole. The water feed cover 222 may be a plug made of rubber, or a cover that is made of hard plastic and is in threaded connection to the through hole, so as to prevent water in the first water storage cavity 221 from flowing out. The water tank 220 is fixed at an upper part of the housing 100 through a fastener or a snap-in slot and a buckle, and the atomizer 210 is mounted on a lower side of the water tank 220. A spray nozzle of the atomizer 210 faces the accommodating cavity 110. An upper side of the atomizer 210 is connected with the first water storage cavity 221, that is, the water in the first water storage cavity 221 will be vaporized into water mist under the action of the atomizer 210 and is sprayed to the accommodating cavity 110.

The cooling part 300 mainly includes the wet curtain filter net 310 and the fan 320 which are both fixed on the housing 100. The function of the fan 320 is to blow the water mist that is sprayed by the atomizer 210 to the accommodating cavity 110 out of the accommodating cavity 110 from the air outlet 111, so the fan 320 is arranged between the air outlet 111 and the air inlet 112. It can be understood that hot air in an environment where the evaporative air cooler is located enters the accommodating cavity 110 from the air inlet 112. By means of heat convection and heat conduction, the hot air exchanges heat with the water mist in the accommodating cavity 110. Later, under the action of the fan 320, the cooled air carrying the water mist is blown out of the accommodating cavity 110, so that a humidifying effect is also achieved while the external environment is cooled. The wet curtain filter net 310 is similar to a hollow plate, on which a plurality of through holes are formed. An axial direction of each through hole is the same as a moving direction of the water mist under the action of the fan 320, so the water mist can pass through the wet curtain filter net 310 from these through holes. It should be understood that the wet curtain filter net 310 and the atomizer 210 at this time may be located on a side of the fan 320 facing the air outlet 111 and may also be located on a side of the fan 320 facing the air inlet 112, or the wet curtain filter net 310 is located on the side of the fan 320 facing the air outlet 111, and the atomizer 210 is located on the side of the fan 320 facing the air inlet 112.

During actual use, most of the water mist in the accommodating cavity 110 will be blown out of the accommodating cavity 110, but there is still a little of water mist attached to the inner wall of the accommodating cavity 110 or a fan blade of the fan 320, i.e., condensed water. The condensed water flows into the water storage tank 120 under the gravity or the action of air blown by the fan 320. In order to realize repeated use of the condensed water, the wet curtain filter net 310 is accommodated in the accommodating cavity 110 and the water storage tank 120 at the same time, that is, a lower end of the wet curtain filter net 310 will be located in the water storage tank 120. The wet curtain filter net 310 is made of cotton cloth, wood pulp paper or polypropylene (PP) corrugated paper which has relatively high water absorption property, so that the condensed water flowing into the water storage tank 120 will enter the accommodating cavity 110 again along the wet curtain filter net 310 via the absorption of the wet curtain filter net 310. This part of condensed water and the water mist adsorbed on the wet curtain filter net 310 through the through holes in the wet curtain filter net 310 may be re-evaporated or blown out of the accommodating cavity 110 along with the air in the form of tiny water droplets under the action of the air blown by the fan 320.

It can be understood that by means of the above design, the condensed water generated in the use process of the evaporative air cooler can be reused in time, thus effectively saving water resources and avoiding excessive waste. Meanwhile, since the wet curtain filter net 310 absorbs more water, the water on the wet curtain filter net 310 may be evaporated to absorb heat, and a heat exchange area of the air and the water is further enlarged to a certain extent, and the cooling capacity of the evaporative air cooler is improved.

In some specific embodiments of the present disclosure, a water storage part 400 is further included. The water storage part 400 is fixed below the housing 100; a second water storage cavity 410 is arranged in the water storage part 400; a bottom of the water storage tank 120 is provided with a communicating hole; the communicating hole is used to communicate the second water storage cavity 410 with the water storage tank 120; and the wet curtain filter net 310 passes through the communicating hole and is accommodated in the accommodating cavity 110, the water storage tank 120, and the second water storage cavity 410.

Specifically, when the power of the atomizer is relatively high, more water mist may be generated. Meanwhile, more condensed water may be generated in the accommodating cavity 110. The speed of the wet curtain filter net 310 for absorbing the condensed water is limited, so this may cause the wet curtain filter net 310 to fail in timely absorbing the condensed water that has been accumulated in the water storage tank 120. In order to avoid the condensed water in the water storage tank 120 from overflowing, the water storage part 400 is provided. The water storage part 400 is fixed to the housing 100 through a fastener or in a snap-in slot and buckle connection manner or other connection manners, and is located below the water storage tank 120.

The second water storage cavity 410 is arranged in the water storage part 400, and the bottom of the water storage tank 120 is provided with a through hole that is the communicating hole. By the arrangement of the communicating hole, the water storage tank 120 communicates with the second water storage cavity 410, so the condensed water in the water storage tank 120 can flow into the second water storage cavity 410 from the communicating hole. Meanwhile, the wet curtain filter net 310 is lengthened so that the wet curtain filter net 310 is simultaneously accommodated in the accommodating cavity 110, the water storage tank 120, and the second water storage cavity 410, that is, the lower end of the wet curtain filter net 310 can penetrate into the second water storage cavity 410 from the communicating hole and absorb the condensed water in the second water storage cavity 410.

It can be understood that such a design solves the problem that the volume of the water storage tank 120 is not enough, further improves the condensed water absorption capacity of the wet curtain filter net 310, and accelerates the reuse of the condensed water.

In some specific embodiments of the present disclosure, the second water storage cavity 410 is provided with a water outlet 411 which is used to discharge the condensed water in the second water storage cavity 410.

Specifically, the generation rate of the condensed water may still be greater than the absorption speed of the wet curtain filter net 310 in some cases, so that the condensed water in the second water storage cavity 410 tends to increase. Therefore, a bottom of the second water storage cavity 410 is provided with the water outlet 411. When too much condensed water is in the second water storage cavity 410, or when water in the first water storage cavity 221 is insufficient, the condensed water in the second water storage cavity 410 may be discharged from the water outlet 411 out of the second water storage cavity 410. In order to avoid the waste, the discharged condensed water is added into the first water storage cavity 221, or is used for other purposes, thereby realizing reuse of the condensed water, which effectively reduces the waste.

In some specific embodiments of the present disclosure, a nano sponge is paved in the water storage tank 120.

Specifically, the nano sponge is an object with relatively high absorption capacity. By means of paving the nano sponge in the water storage tank 120, the volume of the condensed water that can be stored in the water storage tank 120 is effectively increased.

Further, the nano sponge is only paved in a space of the water storage tank 120 between the wet curtain filter net 310 and the air outlet 111. Since the condensed water is mainly generated between the wet curtain filter net 310 and the air outlet 111, the nano sponge is only paved in this section, which improves the water storage capacity of the water storage tank 120 and reduces the cost.

In some specific embodiments of the present disclosure, the wet curtain filter net 310 is arranged on a side of the atomizer 210 facing the air outlet 111.

Specifically, the wet curtain filter net 310 is arranged on the side of the atomizer 210 facing the air outlet 111 so that most of the water mist sprayed by the atomizer 210 will pass through the wet curtain filter net 310 or be directly absorbed by the wet curtain filter net 310, which guarantees the humidity of the upper part of the wet curtain filter net 310 and ensures that when there is air blown through the wet curtain filter net 310, an enough amount of water on the wet curtain filter net 310 may be evaporated to absorb heat, thus achieving the objective of cooling.

In some embodiments of the present disclosure, a material of the wet curtain filter net 310 is cotton cloth or non-woven cloth or wood pulp paper or polypropylene.

Specifically, the wet curtain filter net 310 is made of the cotton cloth, the non-woven cloth, wood pulp paper or polypropylene (PP) corrugated paper. These materials all have good water absorption property, thus ensuring that the wet curtain filter net 310 has good water absorption property.

In some embodiments of the present disclosure, a control part is further included; and the control part is mounted to the housing 100 and is used to switch working modes of the evaporative air cooler.

Specifically, the control part is arranged on a side of the housing 100 provided with the water tank 220. The control part includes a printed circuit board (PCB), a control button 510, a power supply, related wires, and the like. The PCB, the control button 510, and the power supply are electrically connected through the wires. The PCB is used to control the evaporative air cooler to start to work or stop working, and a function, for example, for adjusting the working power of the atomizer 210 may also be added according to an actual situation, or a time interval is set to enable the evaporative air cooler to start to work. The user can specifically control the evaporative air cooler by operating the control button 510. The power supply supplies electric energy for the work of the evaporative air cooler. The power supply may be a rechargeable battery or a voltage stabilizer that is connected with an external power supply to realize power supplying during working.

In some specific embodiments of the present disclosure, an air guide member 130 is further included. The air guide member 130 is fixed to the housing 100 and is disposed at the air outlet 111. The air guide member 130 is used to guide a direction where the water vapor is blown out from the air outlet 111.

Specifically, a plurality of air guide members 130 are arranged at the air outlet 111. The air guide member 130 is a rectangular thin sheet, two ends of which are provided with columnar bulges. The housing 100 is provided with corresponding round holes at the air outlet. The columnar bulges of the air guide members 130 can be plugged into the round holes of the housing 100, so that the air guide members 130 can rotate around a fixed axis relative to the housing 100 when being connected to the housing 100. A distance between two adjacent air guide members 130 is equal. It can be understood that by the arrangement of the air guide members 130, the user can adjust, by means of rotating the air guide members 130, the direction of the air blown out from the air outlet 111.

In some specific embodiments of the present disclosure, a water level window 140 is further included. A water level hole is formed in the housing 100 and communicates with the first water storage cavity 221; and the water level window 140 is embedded into the water level hole and is used to observe a water level in the first water storage cavity 221 from the outside.

Specifically, in order to better observe the water level in the first water storage cavity 221, a strip-type through hole is formed in the housing 100. This through hole is the water level hole. The water level hole communicates with the first water storage cavity 221. At this time, the water level window 140 is embedded into the water level hole. The water level window 140 is made of transparent plastic and is used to prevent the water in the first water storage cavity 221 from leaking. If the user needs to learn about the water level in the first water storage cavity 221, the user observes the inside through the water level window 140.

In some specific embodiments of the present disclosure, a handle 520 is further included. Two ends of the handle 520 are respectively connected to the housing 100.

Specifically, the handle 520 may be of a deformable "n"-shaped structure made of hard plastic, or may be a cotton tape made of nylon, linen, and other flexible materials. The two ends of the handle 520 are respectively connected to the housing 100 through a fastener or a snap-slot and a buckle, and can rotate relative to the housing 100, so that the user can conveniently change the position of the evaporative air cooler through the handle 520.

The above describes the embodiments of the present disclosure in detail in combination with the accompanying drawings, but the present disclosure is not limited to the above-mentioned embodiments. Various changes can be further made within the knowledge scope of those ordinarily skilled in the art and without departing from the concept of the present disclosure.

What is claimed is:

1. An evaporative air cooler, comprising:
    a housing, an accommodating cavity being arranged in the housing, a water storage tank being arranged at a bottom of the housing, the accommodating cavity being provided with an air inlet and an air outlet, and the accommodating cavity communicating with the water storage tank;
    an atomization part comprising an atomizer and a water tank, the water tank being fixed to the housing, a first water storage cavity being arranged in the water tank, the atomizer being fixed to the water tank and placed in the accommodating cavity, and the atomizer being used to atomize, in the accommodating cavity, water in the first water storage cavity into water vapor;
    a cooling part comprising a wet curtain filter net and a fan, the wet curtain filter net and the fan being fixed to the housing, the fan being arranged between the air inlet and the air outlet, the wet curtain filter net being accommodated in the accommodating cavity and the water storage tank, the fan being used to blow the water vapor from the air outlet out of the accommodating cavity, and the wet curtain filter net being used to allow the water vapor to pass and absorb the condensed water in the water storage tank; and
    a water storage part, wherein the water storage part is fixed below the housing; a second water storage cavity is arranged in the water storage part; a bottom of the water storage tank is provided with a communicating hole which is used to communicate the second water storage cavity with the water storage tank; and the wet curtain filter net passes through the communicating hole and is accommodated in the accommodating cavity, the water storage tank, and the second water storage cavity.

2. The evaporative air cooler according to claim 1, wherein the second water storage cavity is provided with a water outlet which is used to discharge the condensed water in the second water storage cavity.

3. The evaporative air cooler according to claim 1, wherein a nano sponge is paved in the water storage tank.

4. The evaporative air cooler according to claim 1, wherein the wet curtain filter net is arranged on a side of the atomizer facing the air outlet.

5. The evaporative air cooler according to claim 1, wherein a material of the wet curtain filter net is cotton cloth or non-woven cloth or wood pulp paper or polypropylene.

6. The evaporative air cooler according to claim 1, further comprising a control part, wherein the control part is mounted to the housing and is used to switch working modes of the evaporative air cooler.

7. The evaporative air cooler according to claim 1, further comprising an air guide member, wherein the air guide member is fixed to the housing and is arranged at the air outlet; and the air guide member is used to guide a direction where the water vapor is blown out from the air outlet.

8. The evaporative air cooler according to claim 1, further comprising a water level window, wherein a water level hole is formed in the housing and communicates with the first water storage cavity; and the water level window is embedded into the water level hole and is used to observe a water level in the first water storage cavity from the outside.

9. The evaporative air cooler according to claim 1, further comprising a handle, wherein two ends of the handle are respectively connected to the housing.

* * * * *